(12) United States Patent
Kitajima (10) Patent No.: US 6,236,502 B1
(45) Date of Patent: May 22, 2001

(54) OPERATION MICROSCOPE INCLUDING A BRANCH OBSERVATION OPTICAL SYSTEM DISPLAY

(75) Inventor: Nobuaki Kitajima, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/477,827

(22) Filed: Jan. 5, 2000

(30) Foreign Application Priority Data

Jul. 1, 1999 (JP) .................................................. 11-001941

(51) Int. Cl.$^7$ ............................ G02B 21/06; G02B 21/18; G02B 27/18

(52) U.S. Cl. ............................ 359/389; 359/377; 359/368

(58) Field of Search ..................................... 359/389, 385, 359/372, 377, 368

(56) References Cited

U.S. PATENT DOCUMENTS 5,579,772 * 12/1996 Kinukawa et al. .................. 128/665

5,889,577 * 3/1999 Kohayakawa et al. .............. 351/211

* cited by examiner

Primary Examiner—Jon Henry
(74) Attorney, Agent, or Firm—Armstrong, Westerman Hattori, McLeland, and Naughton, LLP (57) ABSTRACT

In an operation microscope, target light flux that is parallel light flux is projected at eyes of an operator, light reflected thereon is used to obtain an image of the pupil of the eye, and the position of a Purkinje image is detected to calculate the direction of the visual line of the operator's eyes. Observation magnification of an observation optical system is also calculated from the output of a potentiometer. The resultant direction of the visual line and observation magnification are used to calculate the position of the visual line of the operator. A liquid crystal display is arranged behind a half mirror when viewed from eyepiece side of a branch observation optical system, and displays as a spot image the position information indicating the calculated position of the visual line of the operator's eye.

7 Claims, 8 Drawing Sheets

OPERATION MICROSCOPE INCLUDING A BRANCH OBSERVATION OPTICAL SYSTEM DISPLAY

BACKGROUND OF THE INVENTION

1. Field of the Invention

The present invention relates to an operation microscope which magnifies an object in order to perform a desired operation while observing the magnified object. More specifically, the invention relates to a microscope for surgery which is used to observe stereoscopically an observation object such as an eye of a patient, in ophthalmic, encephalic, or other medical diagnosis, treatment and surgery, or to an industrial stereoscopic microscope for processing and checking electronic parts, etc.

2. Description of Related Art

Conventionally, binocular stereoscopic microscopes with which a surgery region such as an eye of a patient can be stereoscopically observed as an observation object are widely used in ophthalmic surgery, encephalic surgery, etc. In such a binocular stereoscopic microscope for surgery, a branch observation optical system is provided. The branch observation optical system is branched from a main observation optical system that is used by an operator to observe an observation object, with the intention of making it possible for an assistant to assist the operator or for an intern to study the ongoing surgery.

In a case where, for instance, an operator gives a treatment in ophthalmic surgery on a certain region of a patient's eye using tweezers, a scalpel, etc., the operator pays attention not only to the region treated but also to other regions, and keeps watching over an undesirable sign of the patient's eye during the treatment. Namely, the apparent field of a microscope for surgery sometimes reaches up to 50 degrees, and though the subject region of the treatment may occupy merely a part of that field of view at some point in the treatment, the operator gives attention to the entire field of view of the microscope, not the partial field of view thereof.

Meanwhile, the operator may give instructions to assistants regarding to treatment or operation of the surgery, or explanations to observers regarding to a method or procedure of the surgery. Such instructions or explanations often cover regions other than the region to be treated.

Unfortunately, there are considerable difficulties for the operator in wording a region that is the subject of the operator's instructions or explanations. For that reason, with a conventional microscope for surgery, the operator has to stop the surgery for a while to indicate the region concerned using tweezers or the like, which involves inconvenience of hindering quick completion of the surgery.

SUMMARY OF THE INVENTION

The present invention has been made in view of the above circumstances, and therefore an object of the present invention is to provide an operation microscope with which an assistant, or the like, can readily know which position in the field of view of the microscope the operator gazes at, to thereby lighten the burden of the operator and quickly complete the operation such as the surgery.

In order to solve the above problems, there is provided an operation microscope according to the present invention including: a main observation optical system for observing an observation object; a branch observation optical system branched from the main observation optical system; visual line direction detecting means for detecting a direction of a visual line of an observer who observes the observation object with the main observation optical system; calculating means for calculating a position of the visual line of the observer with respect to the observation object, in accordance with the direction of the visual line detected by the visual line direction detecting means; and display means arranged in the branch observation optical system, for displaying position information representing the position of the visual line calculated by the calculating means.

In order to solve the above problems, there is provided an operation microscope according to the present invention including: a main observation optical system for observing an observation object; a branch observation optical system branched from the main observation optical system; projecting means for projecting a target light flux to eyes of an observer who observes the observation object with the main observation optical system; position detecting means for detecting a position of a Purkinje image formed by reflected light from the eyes of the observer, the reflected light being the reflection of the target light flux projected by the projecting means; visual line direction detecting means for detecting a direction of a visual line of the observer in accordance with the position of the Purkinje image detected by the position detecting means; calculating means for calculating a position of the visual line of the observer with respect to the observation object, in accordance with the direction of the visual line detected by the visual line direction detecting means; and display means arranged in the branch observation optical system, for displaying position information representing the position of the visual line calculated by the calculating means.

In order to solve the above problems, there is provided an operation microscope according to the present invention including: a main observation optical system for observing an observation object; a branch observation optical system branched from the main observation optical system; projecting means for projecting a target light flux to eyes of an observer who observes the observation object with the main observation optical system; obtaining means for obtaining pupil images of the eyes of the observer with the target light flux projected by the projecting means; position detecting means for detecting a position of a Purkinje image formed by reflected light from the eyes of the observer, the reflected light being the reflection of the target light flux projected by the projecting means; visual line direction detecting means for detecting a direction of a visual line the observer, in accordance with the pupil images of the eyes of the observer which is obtained by the obtaining means and the position of the Purkinje image which is detected by the position detecting means; calculating means for calculating a position of the visual line of the observer with respect to the observation object, in accordance with the direction of the visual line detected by the visual line direction detecting means; and display means arranged in the branch observation optical system, for displaying position information representing the position of the visual line calculated by the calculating means.

In the above operation microscope, the position information displayed in the display means can be observed with the branch observation optical system.

In order to solve the above problems, there is provided an operation microscope according to the present invention including: an observation optical system for observing an observation object; an imaging optical system branched from the observation optical system, for obtaining an observation image of the observation object; visual line direction detecting means for detecting a direction of a visual line of an observer who observes the observation object with the observation optical system; calculating means for calculating a position of the visual line of the observer with respect to the observation object, in accordance with the direction of the visual line detected by the visual line direction detecting means; and display means for displaying position information representing the position of the visual line calculated by the calculating means on the observation image obtained by the imaging optical system.

DETAILED DESCRIPTION OF THE PREFERRED EMBODIMENTS

Hereinafter, embodiments of the present invention will be described, taking as an example an operation microscope, with reference to the drawings.

(Embodiment 1)

Figure 1:
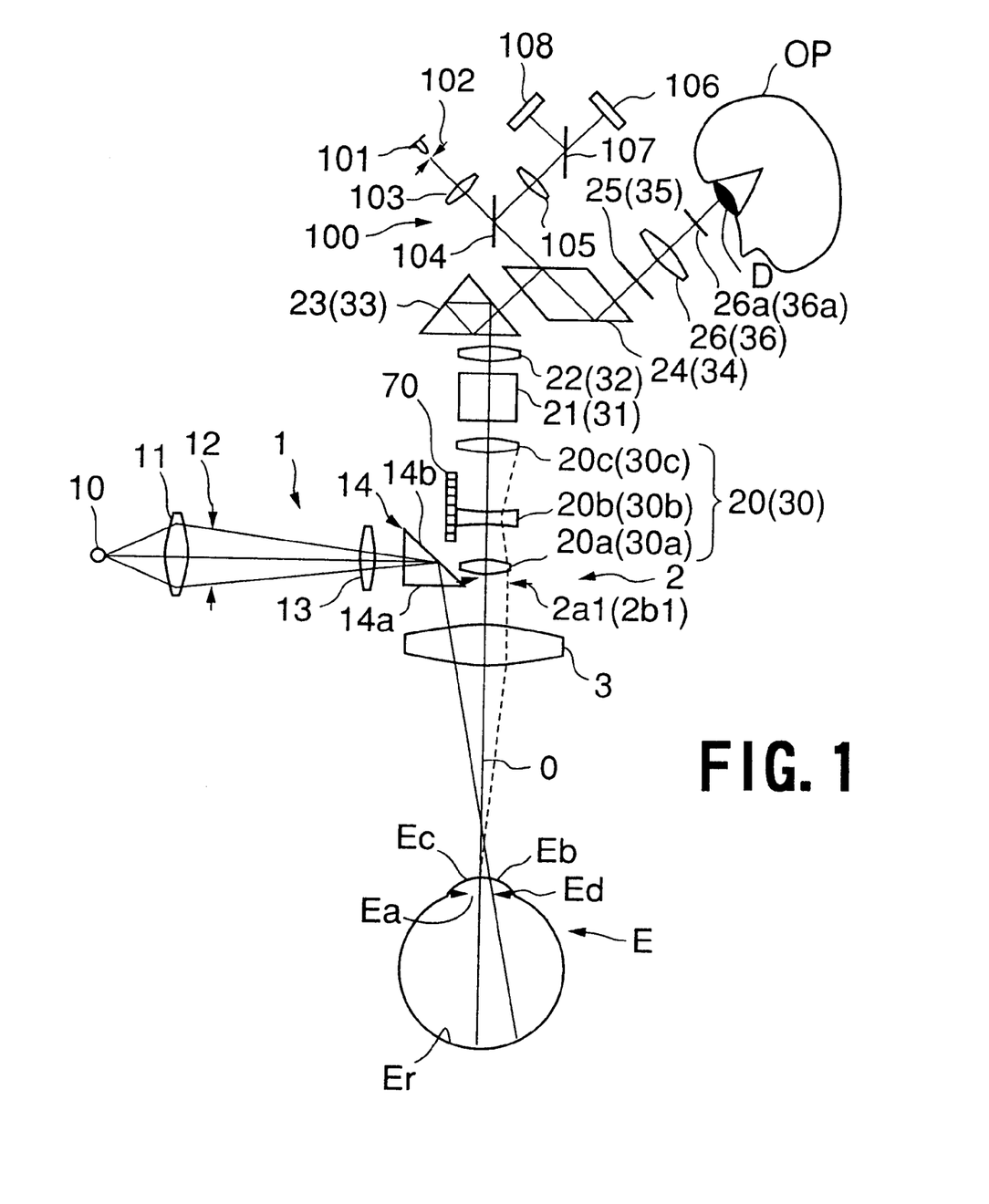
FIG. 1 is a structural diagram showing an optical system of an operation microscope according to Embodiment 1 of the present invention.
Figure 2:
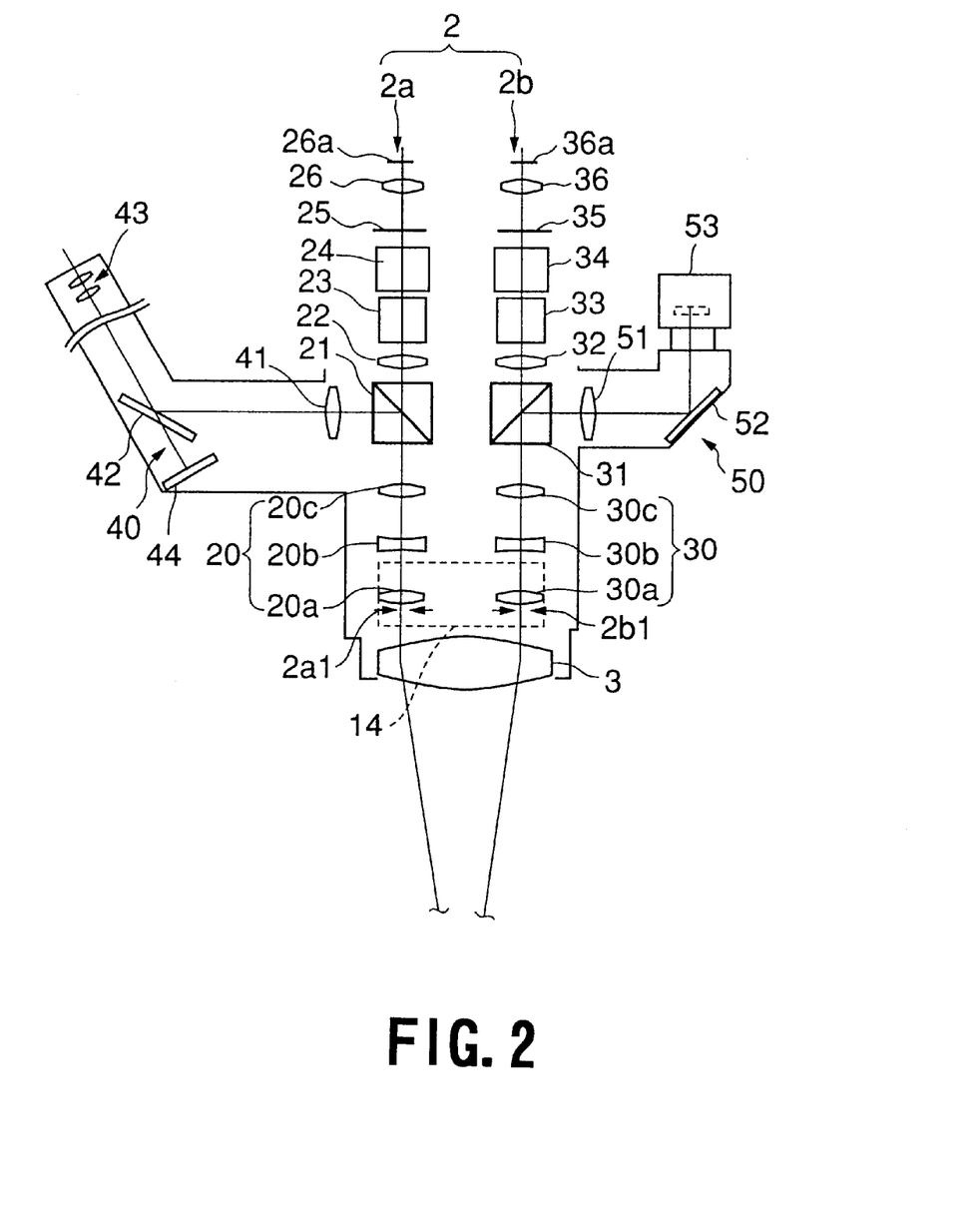
FIG. 2 is a structural diagram showing the optical system of the operation microscope according to Embodiment 1 of the present invention.
Figure 3:
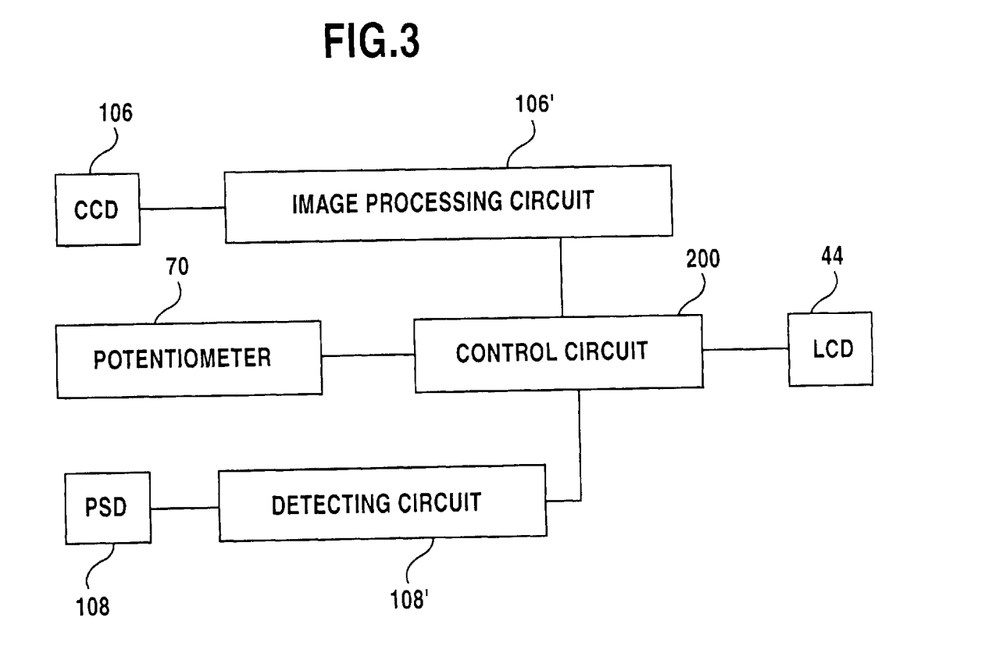
FIG. 3 is a structural block diagram showing a control system of the operation microscope according to Embodiment 1 of the present invention.

FIGS. 1 and 2 are structural diagrams showing an optical system of an operation microscope according to Embodiment 1 of the present invention. FIG. 3 is a structural block diagram showing a control system of the operation microscope according to Embodiment 1 of the present invention. In FIG. 1, reference symbol Er denotes the fundus of an eye E to be examined of a subject such as a patient; Ea, the pupil of the eye E; Eb, the iris of the eye E; Ec, the cornea of the eye E; and Ed, the sclera of the eye E.

The operation microscope according to Embodiment 1 of the present invention shown in FIGS. 1 and 2 has: an illumination optical system 1 for illuminating the eye E to be examined; an observation optical system (main observation optical system) 2 used by an operator OP who observes the eye E as an observation object; a visual line detecting optical system 100 for detecting a visual line of the operator OP; and a liquid crystal display (LCD) 44 used as a visual line position display unit for displaying the position of the visual line of the operator OP. An object lens 3 is shared by the illumination optical system 1 and the observation optical system 2.

The illumination optical system 1 is comprised of an illumination light source 10, a condenser lens 11, an illumination field stop 12, a collimator lens 13, a prism 14 and the object lens 3.

Illumination light emitted from the illumination light source 10 is guided into the collimator lens 13 through the condenser lens 11 and the illumination field stop 12. This illumination light is, further, collimated at the collimator lens 13 and then reflected on a reflection surface 14b of the prism 14. The reflected light is transmitted to irradiate the fundus Er through an exit pupil 14a of the illumination optical system 1, positioned near the emission side of the prism 14, and through the object lens 3 and the pupil Ea. The eye E to be examined is thus illuminated.

The observation optical system 2 includes a right-eye observation optical system 2a and a left-eye observation optical system 2b. The right-eye observation optical system 2a is comprised of the object lens 3, a variable power optical system 20 provided with a variable power lens including three lenses 20a, 20b, 20c, a beam splitter 21, an imaging lens 22, an image erecting prism 23, an interpupillary adjustment prism 24 that is a rhombus-shaped prism, a field stop 25 and an eyepiece 26. In the drawing, reference symbol 2a1 denotes entrance pupil of the right-eye observation optical system 2a, and 26a denotes an image of the entrance pupil 2a1 (i.e., eye point position).

The left-eye observation optical system 2b is comprised of, as is the right-eye observation optical system 2a, the object lens 3, a variable power optical system 30 provided with a variable power lens including three lenses 30a, 30b, 30c, a beam splitter 31, an imaging lens 32, an image erecting prism 33, an interpupillary adjustment prism 34 that is a rhombus-shaped prism, a field stop 35 and an eyepiece 36. In the drawing, reference symbol 2b1 denotes entrance pupil of the left-eye observation optical system 2b, and 36a denotes an image of the entrance pupil 2b1 (i.e., eye point position).

A potentiometer 70 for detecting positions of the variable power lenses constructing the variable power optical systems 20, 30 is provided to obtain observation magnification of the operation microscope.

The light illuminated on the eye E to be examined by the illumination optical system 1 is reflected at the eye E. The reflected light is transmitted through the object lens 3, the variable power optical systems 20, 30, the beam splitters 21, 31, the imaging lenses 22, 32, the prisms 23, 24, 33, 34, the field stops 25, 35 and the eyepieces 26, 36. The operator OP thus observes the eye E with his/her left and right eyes D.

The light reflected from the eye E to be examined is split by the beam splitters 21, 31 from the observation optical system 2. The light split by the beam splitter 21 is guided to a branch observation optical system 40 for assistant, which is comprised of an imaging lens 41, a half mirror 42 and an eyepiece 43. Thus, the branch observation optical system 40 allows people other than the operator OP, such as an assistant or intern, to observe the eye E to be examined.

The light split by the beam splitter 31 from the observation optical system 2 is guided to a television imaging optical system 50, which is comprised of an imaging lens 51, a reflector mirror 52 and a television camera 53. Thus, the television imaging optical system 50 makes possible television imaging of the eye E to be examined.

The visual line detecting optical system 100 has an infrared light emitting diode (infrared LED) 101, a pinhole 102, a condenser lens 103, half mirrors 104, 107, an imaging lens 105, a charge coupled device (CCD) 106 and a semiconductor position sensitive diode (PSD) 108.

A pair of visual line detecting optical systems 100 may be arranged for the left eye and the right eye, respectively, in correspondence with the observation optical system 2, in order to detect the visual line for each of the left and right eyes D of the operator OP. However, usually, it is sufficient when one visual line detecting optical system is arranged for one of the left and right eyes. Description here will be given on a case where only the visual line for the right eye of the operator OP is detected.

The pinhole 102 is arranged in the optically conjugate relation to the eye point position 26a, and the CCD 106 is arranged in the optically conjugate relation to the eye point position 26a.

Light emitted from the LED 101 passes through the pinhole 102 to serve as a point light source, and joins the optical path of the observation optical system 2 after passing through the condenser lens 103 and the half mirror 104. Further, the light is changed into parallel light flux by the eyepiece 26 through the field stop 25, and is projected as the target light flux at the right eye D of the operator OP.

The target light flux projected at the eye D of the operator OP is reflected on the cornea so that a virtual image is formed at the mid point of the line drawn between the peak of the cornea and the center of curvature of the cornea. The reflected light is then reflected on the half mirror 104 through the eyepiece 26 and the prism 24. A part of the reflected light further passes through the imaging lens 105 and the half mirror 107 to form an image of the pupil of the eye D in the CCD 106. The rest of the reflected light passes through the imaging lens 105, is reflected on the half mirror 107 and enters into the PSD 108.

An image signal corresponding to the image of the pupil of the eye D obtained by the CCD 106 is made into the binary processing in an image processing circuit 106'. This binary information is output to a control circuit 200.

Based on the output of the PSD 108, a detecting circuit 108' detects the position of a luminance point image (Purkinje image) in the eye D. Information on the detected position of the Purkinje image is output to the control circuit 200.

The control circuit 200 calculates, on the basis of the output information from the image processing circuit 106' and the output information from the detecting circuit 108', the direction of visual axis (visual line direction) of the eye D of the operator OP with respect to an optical axis O of the observation optical system 2, utilizing the positional relationship between the Purkinje image and the pupil. The control circuit 200 also calculates the observation magnification of the observation optical system 2 on the basis of the position of the variable power lens that constructs the variable power optical system 20, that is, the position detected by the potentiometer 70.

The control circuit 200 then calculates, on the basis of the resultant visual line direction and observation magnification, the position of a point (gaze point) on the observation image of the eye E to be examined, at which the operator OP gazes, as the position of the visual line.

The liquid crystal display (LCD) 44 used as a visual line position displaying unit is arranged behind the half mirror 42 when viewed from the eyepiece 43 side of the branch observation optical system 40. Accordingly, the control circuit 200 causes the liquid crystal display 44 to display as a spot image the position information about the calculated position of the gaze point (position of visual line) of the eye D of the operator OP.

Figure 4:
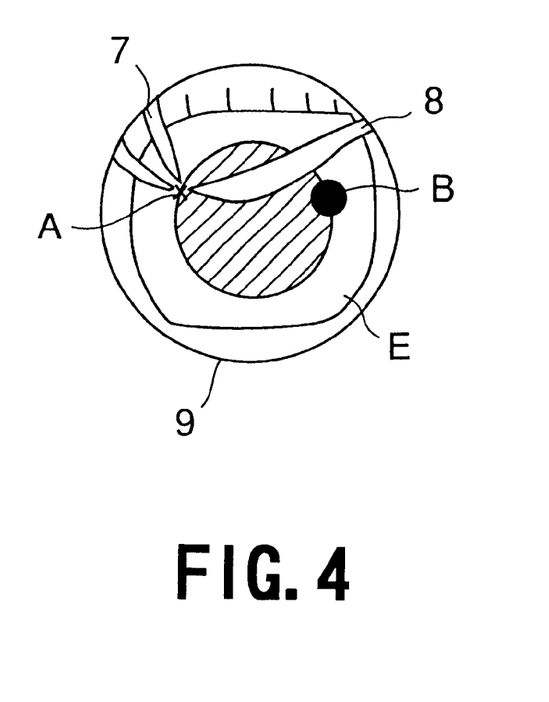
FIG. 4 is an explanatory view showing a gaze point on an observation image of eyes to be examined that is observed with the operation microscope according to Embodiment 1 of the present invention.

For instance, as shown in FIG. 4, the operator OP gives treatment on a treated point A in the eye E to be examined using tweezers 7 and a scalpel 8. During the treatment, when the operator OP looks at a gaze point B too, a spot image indicating the gaze point B is displayed on the liquid crystal display 44 through the process described above. Then, an assistant looks into the eyepiece 43 of the branch observation optical system 40, to thereby observe an observation image 9 on which the spot image is shown at the position of the gaze point B.

This allows the assistant to readily know which position in the eye E the operator gazes at, eliminating the need for the operator to stop the treatment to indicate the gaze point with tweezers or the like, as with a conventional operation microscope. Therefore, the burden of the operator during the operation can be lightened and the progress of the operation is expected to be quickened.

Figure 5:
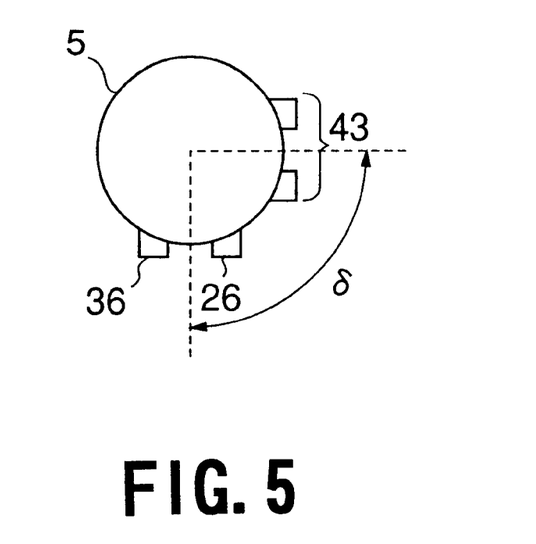
FIG. 5 is an explanatory view showing a positional relationship between an observation optical system for an operator and a branch observation optical system for an assistant in the operation microscope according to Embodiment 1 of the present invention.

As shown in FIG. 5, the observation optical system 2 for operator and the branch observation optical system 40 for assistant are arranged in the operation microscope 5 to form a desired angle δ. Therefore, an observation image of the eye E observed by the assistant with the use of the branch observation optical system 40 corresponds to an image obtained by rotating by the angle δ another observation image of the eye E observed by the operator OP with the use of the observation optical system 2. Accordingly, in the case wherein a spot image indicating the gaze point of the eye D of the operator OP is displayed on the liquid crystal display 44, it is required to determine a display position of the spot image, taking the angle δ into account.

Specifically, when display coordinates of the spot image indicating the gaze point B of the eye D of the operator OP are (Xi, Yi), the gaze point B on the observation image observed by the assistant with the use of the branch observation optical system 40 has to have coordinates (Xi cos δ−Yi sin δ, cos δ(Xi sin δ+Yi cos δ)) in order to present itself on the same position as in the observation optical system 2. The spot image is then displayed on the liquid crystal display 44 at the display position obtained by such coordinate conversion.

When the operator delivers no instructions or no explanations regarding to the treatment to the assistant or the like, the spot image displayed on the liquid crystal display 44 may be rather inconvenient by hindering the assistant from observing the observation image of the eye E to be examined. In such case, the spot image displayed on the liquid crystal display 44 is turned off by, for example, a foot switch (not shown). Also, the spot image may be automatically turned off after the elapse of a preset time.

In Embodiment 1 of the present invention, the liquid crystal display 44 is used as the visual line position display unit to show the position of the visual line of the operator's eye. Alternatively, for instance, LEDs may be arranged into a matrix of 10 ×10 pieces to indicate the position of the visual line of the eye of the operator by lighting an LED arranged in the corresponding position.

In Embodiment 1 of the present invention, a Purkinje image is detected by the PSD 108. However, both the pupil position and the Purkinje image position may be detected by the CCD 106 to omit the half mirror 107 and the PSD 108.

(Embodiment 2)

Figure 6:
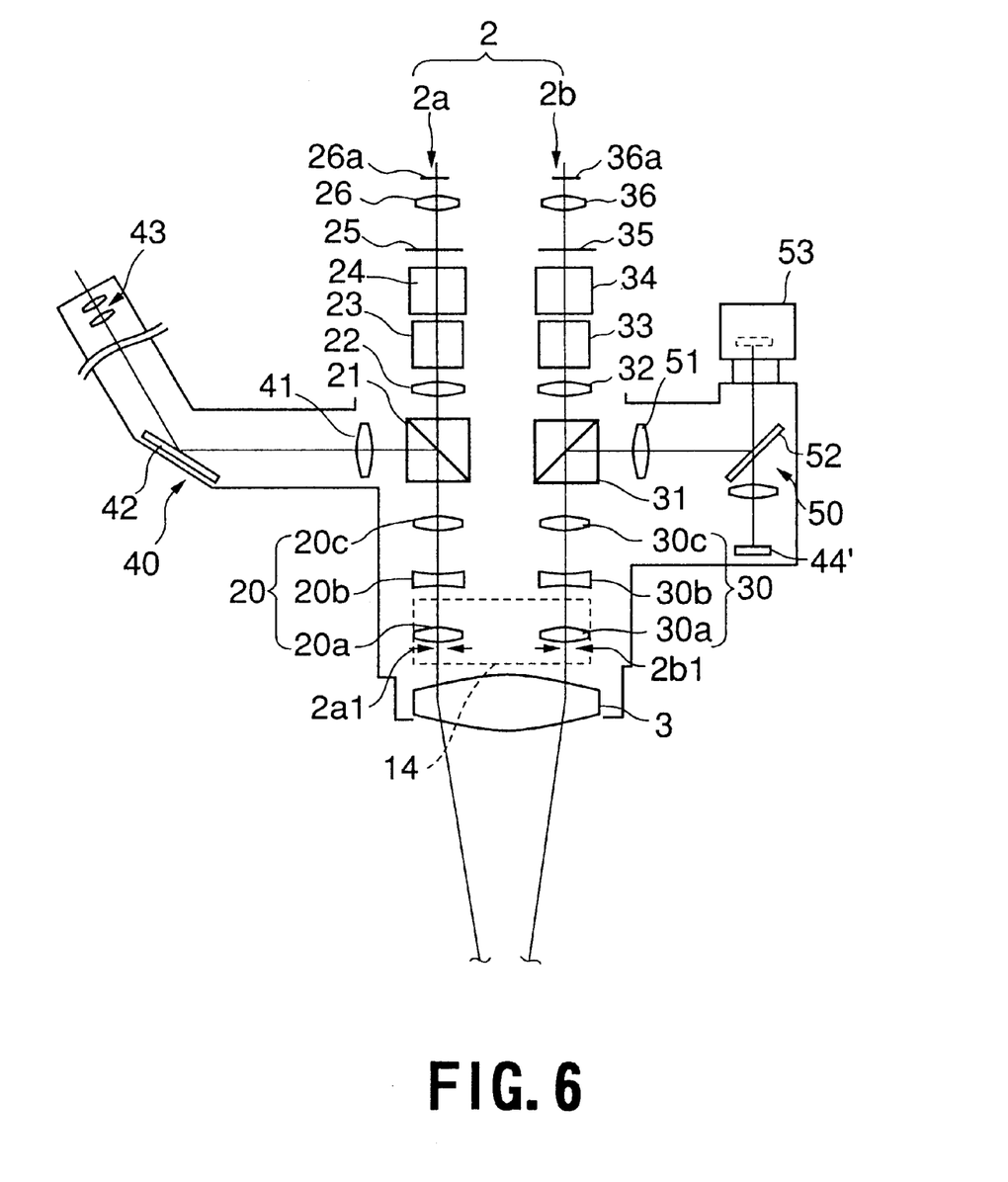
FIG. 6 is a structural diagram showing an optical system of an operation microscope according to Embodiment 2 of the present invention.

FIG. 6 is a structural diagram showing an optical system of an operation microscope according to Embodiment 2 of the present invention. The operation microscope according to Embodiment 2 of the present invention shown in FIG. 6, although having a structure basically similar to the operation microscope according to Embodiment 1 of the present invention, is provided with, instead of the liquid crystal display 44 in the branch observation optical system 40, a liquid crystal display 44' having a function similar to the display 44 in the television imaging optical system 50.

Thus, the same process as in the case of the operation microscope according to Embodiment 1 of the present invention is performed to display on the liquid crystal display 44' a spot image indicating the gaze point B of the operator as position information about the position of the visual line of the operator. The spot image displayed on the liquid crystal display 44' then Joins an optical path in a direction toward the television camera 53, thereby displaying on the television camera 53 an observation image on which the spot image is indicated. People who, for example, study the ongoing operation thus can readily know the gaze point of the operator.

Figure 7:
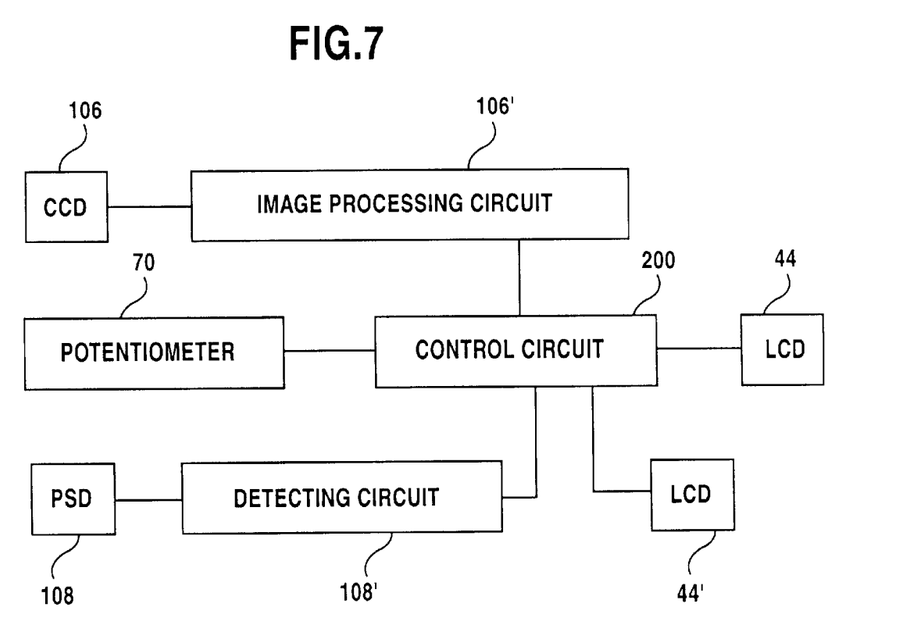
FIG. 7 is a structural block diagram showing a control system of the operation microscope according to Embodiment 2 of the present invention.

Incidentally, as shown in FIG. 7, the operation microscope according to Embodiment 2 of the present invention may further include the liquid crystal display 44 as in the operation microscope according to Embodiment 1 of the present invention.

(Embodiment 3)

Figure 8:
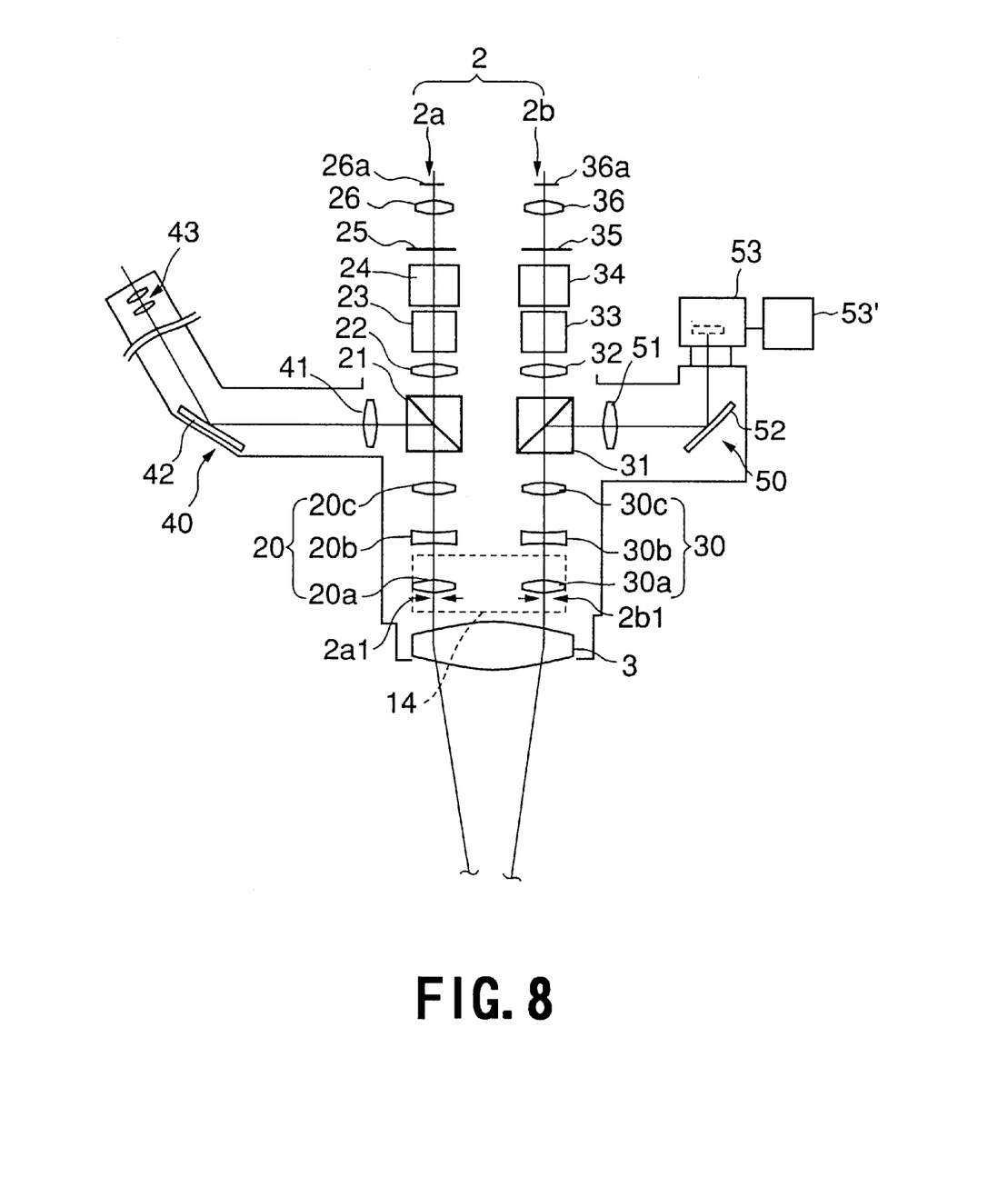
FIG. 8 is a structural diagram showing an optical system of an operation microscope according to Embodiment 3 of the present invention.
Figure 9:
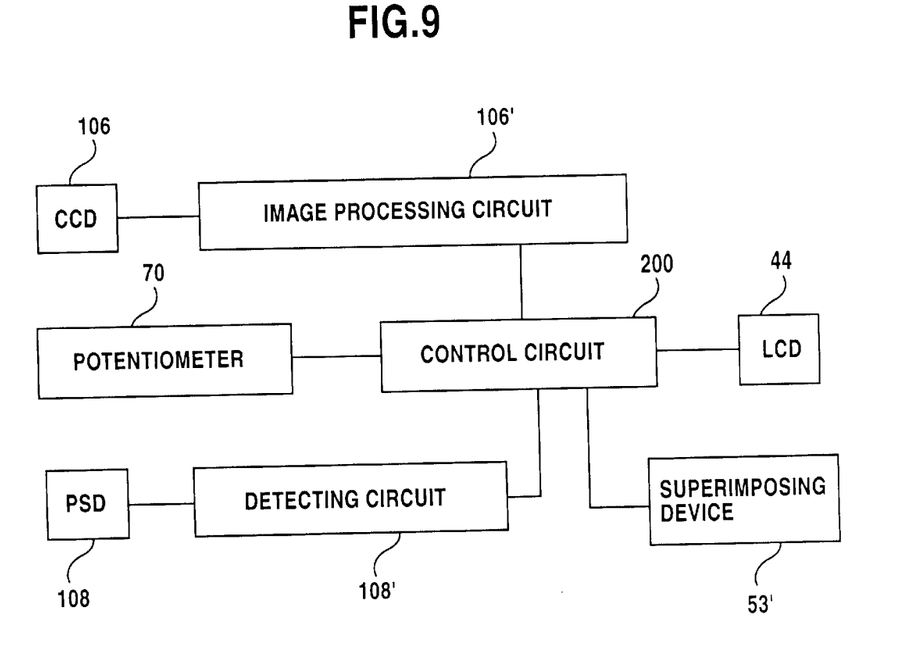
FIG. 9 is a structural block diagram showing a control system of the operation microscope according to Embodiment 3 of the present invention.

FIG. 8 is a structural diagram showing an optical system of an operation microscope according to Embodiment 3 of the present invention, and FIG. 9 is a structural block diagram showing a control system of the operation microscope according to Embodiment 3 of the present invention. The operation microscope according to Embodiment 3 of the present invention shown in FIG. 8, although having a structure basically similar to the operation microscope according to Embodiment 1 of the present invention, is provided with, instead of the liquid crystal display 44 in the branch observation optical system 40, a superimposing device 53'. The superimposing device 53' imposes an arbitrary image upon an observation image displayed on the television camera 53 and is connected to the television camera 53.

Thus, the same process as in the case of the operation microscope according to Embodiment 1 of the present invention is performed, and the superimposing device 53' imposes upon the observation image displayed on the television camera 53 a spot image indicating the gaze point B of the operator as information about the position of the visual line of the operator. Thus, as is the case of the operation microscope according to Embodiment 2 of the present invention, people who study the ongoing operation thus can readily know the gaze point of the operator.

Incidentally, the operation microscope according to Embodiment 3 of the present invention, also, may further include the liquid crystal display 44 as in the operation microscope according to Embodiment 1 of the present invention.

As described above, according to the present invention, the direction of the visual line of an operator who observes an observation object is detected to indicate its position of the visual line as a spot image on another observation image observed by an assistant. The assistant or an intern can thus readily know which point in the field of view of the microscope the operator gazes at, without stopping the operation. This lightens the burden of the operator to quickly complete the operation.

What is claimed is:

1. An operation microscope comprising:

a main observation optical system for observing an observation object;

a branch observation optical system branched from the main observation optical system;

visual line direction detecting means for detecting a direction of a visual line of an observer who observes the observation object with the main observation optical system;

calculating means for calculating a position of the visual line of the observer with respect to the observation object, in accordance with the direction of the visual line detected by the visual line direction detecting means; and display means arranged in the branch observation optical system, for displaying position information representing the position of the visual line calculated by the calculating means.

2. An operation microscope comprising:

a main observation optical system for observing an observation object;

a branch observation optical system branched from the main observation optical system;

projecting means for projecting a target light flux to eyes of an observer who observes the observation object with the main observation optical system;

position detecting means for detecting a position of a Purkinje image formed by reflected light from the eyes of the observer, the reflected light being the reflection of the target light flux projected by the projecting means;

visual line direction detecting means for detecting a direction of a visual line of the observer in accordance with the position of the Purkinje image detected by the position detecting means;

calculating means for calculating a position of the visual line of the observer with respect to the observation object, in accordance with the direction of the visual line detected by the visual line direction detecting means; and display means arranged in the branch observation optical system, for displaying position information representing the position of the visual line calculated by the calculating means.

3. An operation microscope comprising:

a main observation optical system for observing an observation object;

a branch observation optical system branched from the main observation optical system;

projecting means for projecting a target light flux to eyes of an observer who observes the observation object with the main observation optical system;

obtaining means for obtaining pupil images of the eyes of the observer with the target light flux projected by the projecting means;

position detecting means for detecting a position of a Purkinje image formed by reflected light from the eyes of the observer, the reflected light being the reflection of the target light flux projected by the projecting means;

visual line direction detecting means for detecting a direction of a visual line the observer, in accordance with the pupil images of the eyes of the observer which is obtained by the obtaining means and the position of the Purkinje image which is detected by the position detecting means;

calculating means for calculating a position of the visual line of the observer with respect to the observation object, in accordance with the direction of the visual line detected by the visual line direction detecting means; and display means arranged in the branch observation optical system, for displaying position information representing the position of the visual line calculated by the calculating means.

4. The operation microscope according to claim 1 wherein the position information displayed in the display means can be observed with the branch observation optical system.

5. The operation microscope according to claim 2 wherein the position information displayed in the display means can be observed with the branch observation optical system.

6. The operation microscope according to claim 3 wherein the position information displayed in the display means can be observed with the branch observation optical system.

7. An operation microscope comprising:

an observation optical system for observing an observation object;

an imaging optical system branched from the observation optical system, for obtaining an observation image of the observation object;

visual line direction detecting means for detecting a direction of a visual line of an observer who observes the observation object with the observation optical system;

calculating means for calculating a position of the visual line of the observer with respect to the observation object, in accordance with the direction of the visual line detected by the visual line direction detecting means; and display means for displaying position information representing the position of the visual line calculated by the calculating means on the observation image obtained by the imaging optical system.

* * * * *